United States Patent [19]

Hewko et al.

[11] Patent Number: 5,447,360
[45] Date of Patent: Sep. 5, 1995

[54] SIDE IMPACT SEAT BACK STRUCTURE

[75] Inventors: Marc D. Hewko, Canton, Mich.; Martin Zynda; Frank Gerich, both of Remscheid, Germany

[73] Assignee: Hoover Universal, Inc., Plymouth, Mich.

[21] Appl. No.: 129,925

[22] Filed: Sep. 30, 1993

[51] Int. Cl.⁶ .............................. B60N 2/42
[52] U.S. Cl. .................. 297/452.18; 297/216.13
[58] Field of Search ........ 297/216.1, 216.13, 452.18, 297/452.2, 452.1

[56] References Cited

U.S. PATENT DOCUMENTS

| | | | |
|---|---|---|---|
| 2,118,456 | 5/1938 | Whedon | 297/452.18 X |
| 4,003,534 | 1/1977 | Kenigsberg et al. | 297/216.13 X |
| 4,076,306 | 2/1978 | Satzinger | 297/216.13 |
| 4,192,545 | 3/1980 | Higuchi et al. | 297/216 |
| 4,249,769 | 2/1981 | Barecki | 297/216.13 X |
| 5,165,756 | 11/1992 | Baker et al. | 297/452 |
| 5,232,264 | 8/1993 | Hoshihara | 297/344.1 |
| 5,246,271 | 9/1993 | Boisset | 297/452.2 X |
| 5,318,341 | 6/1994 | Griswold et al. | 297/362.11 |

FOREIGN PATENT DOCUMENTS

| | | |
|---|---|---|
| 0244785 | 11/1987 | European Pat. Off. |
| 4109179 | 9/1991 | Germany |
| 4209391 | 10/1992 | Germany |
| 4213917 | 11/1992 | Germany |
| 4208150 | 9/1993 | Germany |
| 0183541 | 1/1922 | United Kingdom ........ 297/452.18 |
| 2246699 | 2/1992 | United Kingdom |

*Primary Examiner*—Kenneth J. Dorner
*Assistant Examiner*—Milton Nelson, Jr.
*Attorney, Agent, or Firm*—Leonard Kalinowski; E. L. Levine; Joseph E. Root, III

[57] ABSTRACT

A vehicle seat back frame including two bracing members, one being linearly extended from the lower end of the outboard upright member to the upper end of the inboard upright member and the other being extended linearly from the lower end of the inboard upright member to the upper end of the outboard upright member, the bracing members being connected together at a point intermediate their ends so that a side impact load applied to the seat back frame will place one of the bracing members fully, and the upper half of the other member, in tension substantially instantaneously upon the application of the load to the seat back frame, enabling the seat back frame to resist lateral deformation due to side impact forces applied to the seat back frame.

3 Claims, 3 Drawing Sheets

SIDE IMPACT SEAT BACK STRUCTURE

BACKGROUND OF THE INVENTION

This invention relates to seat assemblies for motor vehicles, and more particularly to a seat back frame for a vehicle seat assembly that includes reinforcement for resisting deflection caused by side impact loads.

Conventional seat backs for vehicle seats include a quadrilateral seat back frame. Structural integrity of such seat back flames is provided by vertical inboard and outboard members which are interconnected near their upper and lower ends by horizontally extending cross members and reinforced by gusset plates at the corners of the flame. Although this type of reinforcement provides a degree of rigidity to the seat back, it does prevent deflection of the seat back frame in response to a side impact, resulting in lateral distortion of the seat back, particularly under a high impact load. Because the vehicle seats are the primary means of support for the occupants of the vehicle, the lateral distortion of the seat caused by the deflection of the seat can result in injury to the occupant of the seat, particularly under high impact load conditions.

In U.S. Pat. No. 4,192,545, there is disclosed a vehicle seat back frame which is reinforced by a brace which extends diagonally from the lower end of the outboard side member to the upper end of the inboard side member. The diagonal brace is flexed or bowed in the rearward direction to provide clearance for the seat so that the cushioning property of the seat cushion is not impaired. Although this reinforcement arrangement provides resistance to lateral distortion under side loading conditions, the brace must straighten, resulting in dynamic loading of the brace as it is placed under tension during loading, before the brace is placed in tension and can take the load. Under extreme loads, the dynamic loading could result in a mechanical failure, permitting the seat to deflect or parallelogram. Because the seat is moving or deforming at the time that the tension member is placed in tension, there is dynamic loading which can cause breakage at stress points such as weld points, connections etc.

SUMMARY OF THE INVENTION

The present invention provides an improved seat back frame for a vehicle seat assembly. The seat back frame includes an outboard upright member, an inboard upright member, and upper and lower cross members which interconnect the upright members to form a generally rectangular frame. In accordance with the invention, the seat back frame includes a bracing means including at least one bracing member that is linearly extended from near the lower end of the outboard upright member to near the upper end of the inboard upright member reinforcing the seat back frame to resist deformation due to lateral forces applied to the seat back frame at the outboard upright of the seat assembly. Because the bracing member is linearly extended, it is statically loaded to near tension so that there is substantially no dynamic loading, and the brace member will take the load immediately upon impact.

In accordance with a preferred embodiment, the bracing means further includes a second bracing member which extends from near the lower end of the inboard upright member to near the upper end of the outboard upright member. This dual member bracing arrangement absorbs forces applied from the inboard side of the seat as well as forces applied from the outboard side of the seat assembly. The first and second bracing members are joined together at a junction point that is intermediate their ends so that in response to a lateral force applied to the outboard side of the seat back frame, a tensional force is applied to the first bracing member, that is, the bracing member that extends from the bottom of the outboard upright member to the top of the inboard upright member, and to the portion of the second bracing member that extends between the upper end of the outboard member and the junction point. Moreover, in response to a lateral force applied to the inboard side of the seat back frame, a tensional force is applied to the second bracing member, that is, the bracing member that extends between the lower end of the inboard upright member and the upper end of the outboard upright member, and to the portion of the first bracing member that extends between the upper end of the inboard member and the junction point. The seat back construction provided by the present invention affords improved occupant protection during a side impact by maintaining the structural integrity of the seat back and by transferring of side impact loads from the rocker to the tunnel of the vehicle, so that the load forces are distributed over a broader area.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF PREFERRED EMBODIMENTS

Figure 1:
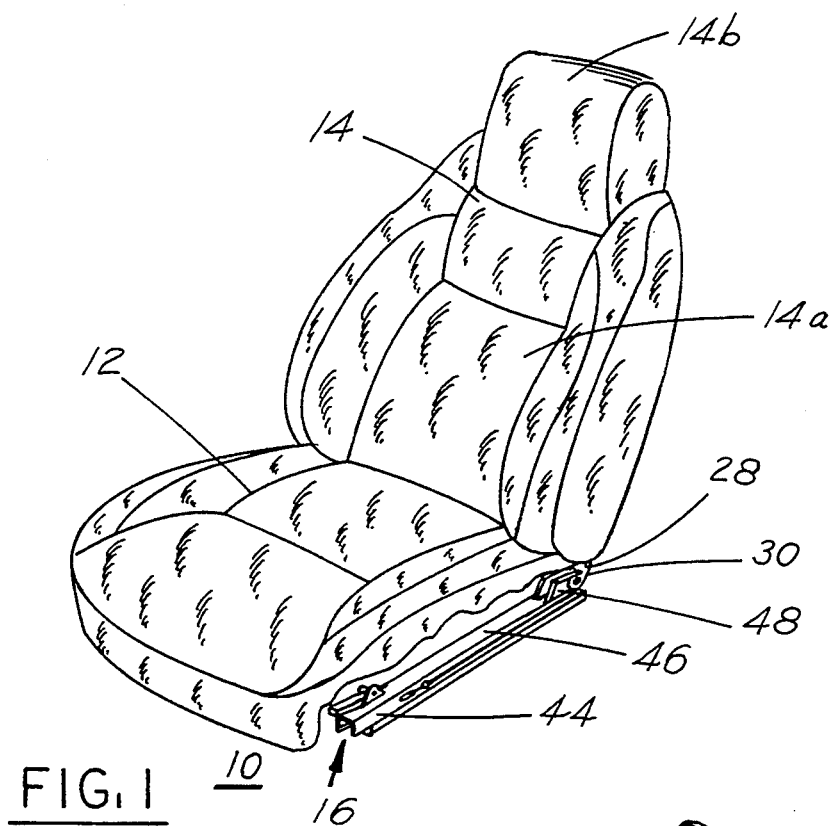
FIG. 1 is a perspective view of a vehicle seat assembly including the reinforcement arrangement provided by the present invention.

Referring to FIG. 1, there is shown a seat assembly 10 for an automobile or other motor vehicle which incorporates the seat back frame reinforcement arrangement according to the present invention. The seat assembly 10 includes a seat cushion assembly 12 and a seat back assembly 14 which extends generally upwardly at the rear of the seat cushion assembly. The seat back assembly 14 includes a seat back portion 14a and a headrest portion 14b supported on a generally rectangular seat back frame 20 which is illustrated in FIGS. 2-4.

For purposes of illustration, the invention is described with reference to an application in a vehicle seat assembly having an integrated belt-in-seat arrangement as is disclosed in copending patent application Ser. No.

07/826,858, now U.S. Pat. No. 5,318,341, entitled Vehicle Seat Assembly With Structural Seat Back To Accommodate Seat Belt Loads Applied To Seat Back, which application is incorporated herein by reference. Also, the seat assembly is assumed to be a single passenger front seat and to be mounted on a pair of fore and aft adjusters, such as fore and aft adjuster 16 illustrated in FIG. 1 which is located at the outboard side of the seat assembly, the other fore and aft adjuster (not shown) being located at the inboard side of the seat assembly. However, the bracing arrangement according to the present invention can also be used on conventional seats, for bench seats, and for rear seat assemblies for vehicles.

Figure 2:
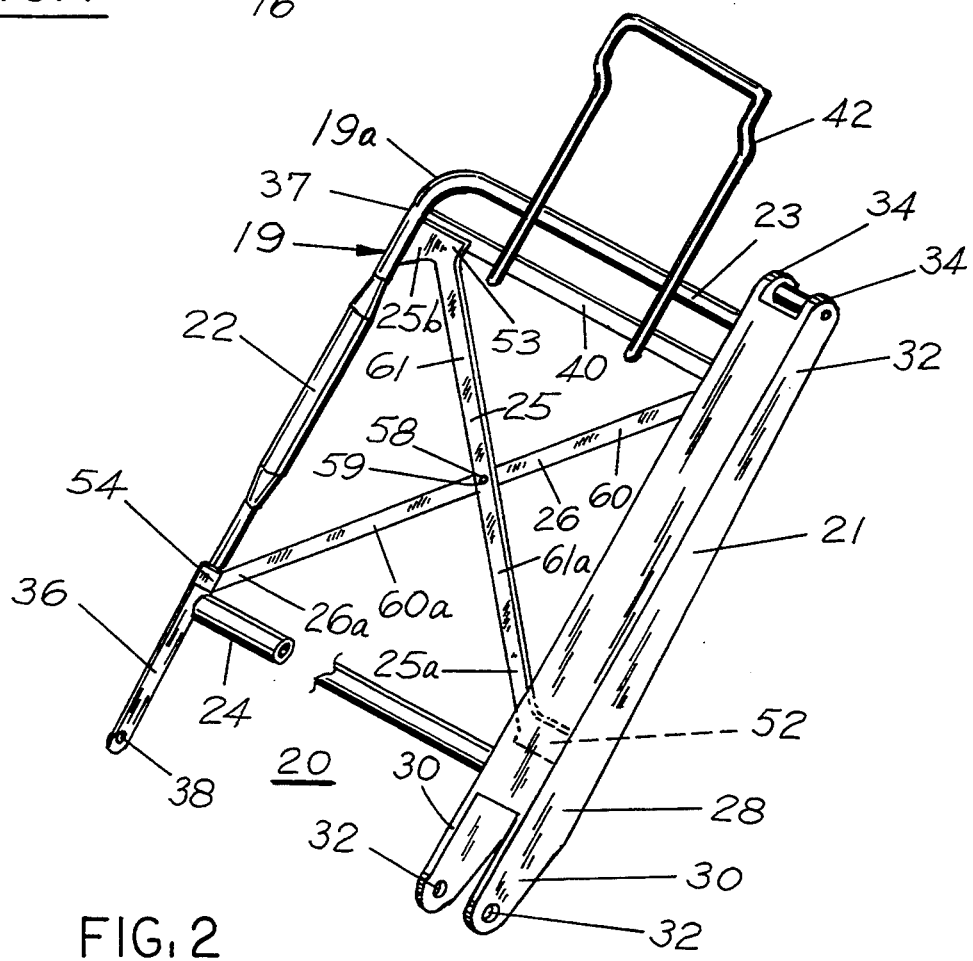
FIG. 2 is an isometric view of the seat back frame of the vehicle seat assembly of FIG. 1, illustrating the two bracing members which provide reinforcement for the vehicle seat assembly.
Figure 3:
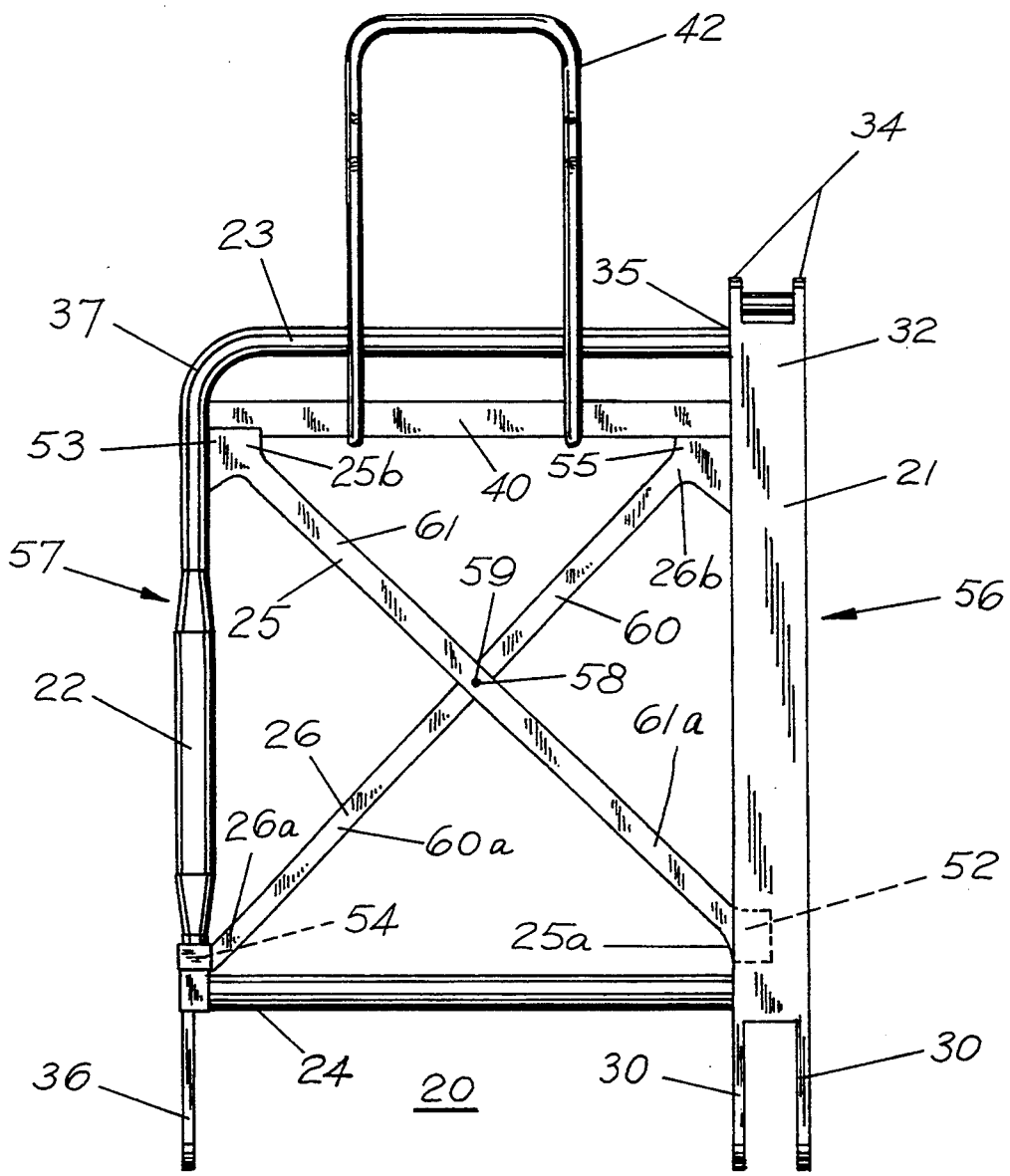
FIG. 3 is a front elevation view of the seat back frame of the vehicle seat assembly shown in FIG. 1.
Figure 4:
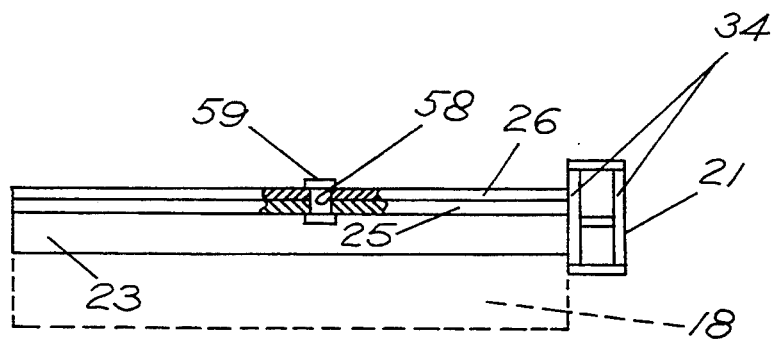
FIG. 4 is top plan view of the seat back frame of the seat assembly shown in FIG. 1, and with the seat back cushion shown in phantom.

Referring to FIGS. 2-4, the seat back frame 20 has an outboard upright member 21, an inboard upright member 22 and an upper cross member 23 formed by a bent tube 19, and a lower cross member 24 which form a quadrilateral shape frame. The seat back frame further includes bracing members 25 and 26. The outboard upright member 21 is a hollow beam that extends vertically upwards along the outboard side of the seat back. The outboard upright member 21 tapers in an upwardly direction so as to reduce the quantity of material used in the beam at the upper end where the moment carried by the beam is reduced. The tapered closed-section of the outboard upright member 21 compensates for the increasing moment along its length to provide uniform material stress. The lower end 28 of the beam 21 forms two parallel mounting flanges 30 which facilitate attachment of the outboard side of the seat back assembly to the fore and aft adjuster assembly 16 and define a pivot axis for the seat back assembly 14. The upper end 32 of the beam 21 forms two parallel mounting flanges 34 to facilitate attachment of the seat belt to the seat back assembly. The lower end 36 of the inboard upright member 22 is flattened and formed with an aperture 38 to facilitate pivotal mounting of the inboard side of the seat back assembly to the fore and aft seat adjuster assembly located at the inboard side of the seat assembly. The manner in which the upright members 21 and 22 are secured to the fore and aft seat adjusters is fully described in the above-referenced patent application Ser. No. 07/826,858. The bend 19a in the tube 19 defines an upper end 37 for the inboard upright member. A further cross member 40, which extends between the inboard and outboard upright members, mounts the headrest frame 42.

Referring to FIG. 1, each fore and aft seat adjuster assembly, such as fore and aft seat adjuster assembly 16, includes a fixed rail 44 that is disposed along the outboard side of the seat assembly and having a track portion that is adapted to engage with a track portion of a slide rail 46 which is mounted on the fixed rail. The seat cushion pan is coupled to the slide rails in a conventional manner. The seat back frame 20 is pivotally mounted to the slide rails and extends upwardly from the rear of the seat cushion in the manner disclosed in the above-referenced patent application Ser. No. 07/826,858, for example. The lower end 28 of the outboard upright member 21 is pivotally connected to a riser portion 48 of the slide rail 46 which extends upwardly in the form of two spaced plates to which the flanges 30 are pivotally connected. The lower end 36 of the inboard upright member 22 is pivotally connected to a riser portion of the slide rail of the inboard fore and aft adjuster assembly in a similar manner.

Referring to FIGS. 2-4, the bracing members are flat metal members having a generally rectangular cross section. One of the bracing members 25 extends diagonally between the upright members from a point near the lower end 28 of the outboard upright member 21 to a point near the upper end 37 of the inboard upright member 22. The bracing member 25 has a mounting flange 52 at one end 25a to facilitate securing the bracing member to the upright member 21 and a mounting flange 53 at its other end 25b to facilitate securing the bracing member to the inboard upright member 22, such as by welding. The bracing member 25 is extended linearly between the upright members. That is, the bracing member 25 is straight and not bowed or curved. Because the bracing member 25 is linearly extended, it is statically loaded to near tension and the bracing member will be placed in tension load immediately in response to a load applied to the outboard side of the seat back frame in the direction of the arrow 56 (FIG. 3).

Similarly, the other bracing member 26 extends diagonally between the upright members from a point near the upper end 32 of the outboard upright member 21 to a point near the lower end 36 of the inboard upright member 22. The bracing member 26 has a mounting flange 54 at one end 26a to facilitate securing the bracing member to the upright member 22 and a mounting flange 55 at its other end 26b to facilitate securing the bracing member to the upright member 21, such as by welding. The bracing member 26 is extended linearly between the upright members. Because the bracing member 26 is linearly extended, it is statically loaded to near tension so that there is less dynamic loading, and the bracing member will be placed in tension load immediately in response to a load applied to the inboard side of the seat back frame in the direction of the arrow 57 (FIG. 3).

The bracing members 25 and 26 provide longitudinal support for the cushion padding, preventing the cushion padding 18 (FIG. 4) from falling through the back of the seat frame and obviating the need for upholstery springs.

The two bracing members 25 and 26 are interconnected at a junction point 58 intermediate their ends by a suitable connection means 59, such as a pin, a rivet, or the like or by a weld. The connection means distributes the load, enabling a tensional force to be applied to the upper portion 60 of the bracing member 26 that extends between the upper end 32 of the outboard upright member 21 and the junction point 58 in response to a lateral force applied in the direction of the arrow 56 to the outboard side of the seat back frame. Moreover, a tensional force is applied to the upper portion 61 of the bracing member 25 that extends between the upper end 37 of the inboard upright member 22 and the junction point 58 in response to a lateral force applied in the direction of the arrow 57 to the inboard side of the seat back frame. In the embodiment illustrated in FIGS. 2-4, the bracing members are flat metal elements having a generally rectangular cross section. However, the bracing members can have any cross section that is appropriate to carry the given loads.

More specifically, the dual brace system absorbs the load from any direction and the connection means 59, which connects the two bracing members together, distributes the load. Therefore, during a vehicle collision, for example, the load applied to the seat back will place one of the bracing members fully in tension, and the upper half of the other member in tension, substantially instantaneously upon the application of a lateral force to the seat back frame. For example, a lateral force applied in the direction of arrow 56 to the outboard side of the seat back frame will produce a tensile load in the diagonal bracing member 25 and in the upper portion 60 of the bracing member 26, a compressive load in the lower portion 60a of the bracing member 26, a tensile load in the lower cross member 24 and a compressive load and forward bending moment in the upright beam 21. Similarly, a lateral force applied in the direction of arrow 57 to the inboard side of the seat back frame will produce a tensile load in the diagonal bracing member 26 and in the upper portion 61 of the bracing member 25, a compressive load in the lower portion 61a of the bracing member 25, a tensile load in the lower cross member 24 and a compressive load and forward bending moment in the inboard upright member 22. The diagonal bracing members will resist the side impact loading in either direction. Moreover, the diagonal bracing members will resist impact loads which are applied to the seat assembly at angles other than 90°, for example, an impact load which is applied at an angle of 45°. Although the application of a lateral force in either direction may result in a slight deformation of the seat back frame 20, the amount of deformation is negligible because both of the bracing members are nearly in tension and react instantaneously to absorb the side impact load.

While providing additional structure and strength to reduce the effects of side impact loads, the seat assembly provided by the present invention also acts as a portion of the load transfer system for the vehicle to cause load forces to be distributed over a broader area. The lower end 25a of the bracing member 25 and the upper end 26b of the bracing member 26 are connected to the outboard upright member 21 which, in turn, has its lower end connected to the rocker portion of the vehicle structure through the outboard fore and aft adjuster assembly 16. The upper end 25b of the bracing member 25 and the lower end 26a of the bracing member 26 are connected to the inboard upright member which, in turn, is connected to the tunnel portion of the vehicle structure through the inboard fore and aft adjuster assembly. Therefore, the reinforced seat back frame serves as a portion of the load transfer system for the vehicle to transfer a portion of side loading from the rocker portion to the tunnel portion of the vehicle structure.

Figure 5:
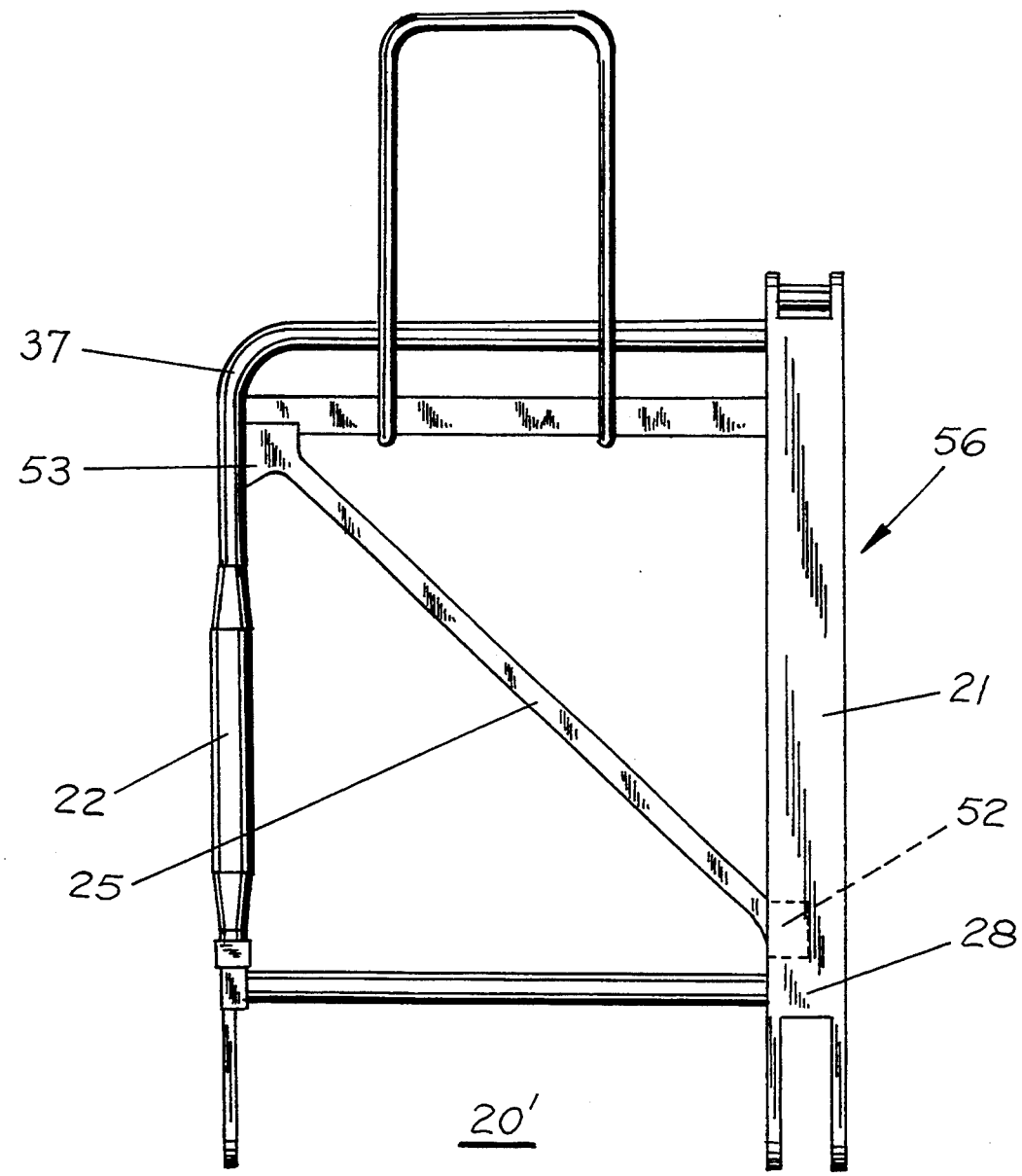
FIG. 5 is front elevation view of a seat back frame incorporating a single reinforcement bracing member, in accordance with another embodiment of the invention.

Referring to FIG. 5, in accordance with a further embodiment for a seat back frame 20', only a single straight bracing member 25 is provided. The bracing member extends linearly from near the bottom end 28 of the outboard upright member 21 to near the upper end 37 of the inboard upright member 22. A lateral load applied in the direction of the arrow 56 to the outboard side of the seat back will produce a tensile load in the bracing member 25 so that the bracing member will resist side impact loading. The bracing member 25 is loaded to near tension so that the bracing member 25 will go into tension as soon as a load is applied, minimizing the effects of dynamic loading.

Thus, it can be seen that the present invention has provided an improved seat back frame for a vehicle seat assembly which includes at least one, and preferably two bracing members one of which is linearly extended from the lower end of the outboard upright member to the upper end of the inboard upright member, and the other of which is extended linearly from the lower end of the inboard upright member to the upper end of the outboard upright member, reinforcing the seat back frame to resist deformation due to lateral forces applied to the seat back frame. Because the bracing members are linearly extended, the bracing members are statically loaded to near tension so that there is substantially no dynamic loading, and the brace members will take the load immediately upon impact. The two bracing members are connected together at a point intermediate their ends by a connection means that distributes the load so that a side impact load applied to the seat back will place one of the bracing members fully and the upper half of the other member in tension substantially instantaneously upon the application of the load to the seat back frame, enabling the seat back frame to resist lateral deformation due to the loading. Moreover, orienting the bracing members to be placed in tension when under a side load condition permits use of bracing members having a smaller cross section, resulting in less weight for the seat assembly.

While particular embodiments of the invention have been described, various changes and modifications can be made without departing from the spirit and scope of the invention as defined by the following claims. For example, although the bracing members have been described as being flat metal strips, the bracing members could be solid or tubular rods, flattened tubular members, wires or braided wires. In the case of wires, they can only take tension loads. Also, the wires would be interconnected at their midpoints by an eyelet or the like at the point where they cross over one another.

We claim:

1. A seat back frame for a vehicle seat assembly comprising: an outward upright member having an upper end and a lower end, an inboard upright member having an upper end and a lower end, upper and lower cross members interconnecting said upright members to form a generally quadrilateral shape frame, and bracing means including a first bracing member extending diagonally between said upright members, said first bracing member being linearly extended, statically loaded to near tension, in the plane of said quadrilateral shape frame from said lower end of said outboard upright member to said upper end of said inboard upright member, and a second bracing member extending diagonally between said upright members, said second bracing member being linearly extended, statically loaded to near tension, in the plane of said quadrilateral shape frame from said upper end of said outboard upright member to said lower end of said inboard upright member, said first and second bracing members each have first and second ends, and including a weld interconnecting said first and second bracing members at a junction point intermediate their ends, whereby a tensional force is applied to said first bracing member and to the portion of said second bracing member extending between said upper end of said upright outboard member and said junction point immediately upon loading of said frame in response to a lateral force applied to the outboard side of said seat back frame, and a tensional force is applied to said second bracing member and to the portion of said first bracing member extending between said upper end of said inboard member and said junction point immediately upon loading of said frame in response to the application of a lateral force to the inboard side of said seat back frame.

2. A seat assembly for a vehicle, said seat assembly comprising: a seat cushion assembly, a seat back assembly extending generally upwardly at the rear of said seat cushion assembly, and means for mounting said seat back assembly for pivoting movement relative to said seat cushion assembly to various inclined positions, said seat back assembly including a seat back cushion and a generally quadrilateral shape seat back frame, said seat back frame having an outboard upright member having an upper end and a lower end, an inboard upright member having an upper end and a lower end, upper and lower cross members interconnecting said upright members to form said generally quadrilateral shape frame, and bracing means including a first bracing member extending diagonally between said upright members, said first bracing member being linearly extended, statically loaded to near tension, in the plane of said quadrilateral shape frame from said lower end of said outboard upright member to said upper end of said inboard upright member, and a second bracing member extending diagonally between said upright members, said second bracing member being linearly extended, statically loaded to near tension, in the plane of said quadrilateral shape frame from said upper end of said outboard upright member to said lower end of said inboard upright member, said first and second bracing members each have first and second ends, and including a weld interconnecting said first and second bracing members at a junction point intermediate their ends, whereby a tensional force is applied to said first bracing member and to the portion of said second bracing member extending between said upper end of said upright outboard member and said junction point immediately upon loading of said frame in response to a lateral force applied to the outboard side of said seat back frame, and a tensional force is applied to said second bracing member and to the portion of said first bracing member extending between said upper end of said inboard member and said junction point immediately upon loading of said frame in response to the application of a lateral force to the inboard side of said seat back frame.

3. The seat assembly according to claim 2, wherein said first and second bracing members at the back of said seat frame prevent rearward movement of said seat back cushion relative to the seat back frame to thereby retain said seat back cushion in the seat back frame.

* * * * *